(12) United States Patent
Gabrys

(10) Patent No.: US 10,437,854 B2
(45) Date of Patent: Oct. 8, 2019

(54) METHOD FOR RECONCILING SIMILAR DATA SETS

(71) Applicant: THE UNITED STATES OF AMERICA AS REPRESENTED BY THE SECRETARY OF THE NAVY, San Diego, CA (US)

(72) Inventor: Ryan C. Gabrys, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 276 days.

(21) Appl. No.: 15/590,200

(22) Filed: May 9, 2017

(65) Prior Publication Data
US 2017/0364603 A1  Dec. 21, 2017

Related U.S. Application Data

(60) Provisional application No. 62/351,717, filed on Jun. 17, 2016.

(51) Int. Cl.
*G06F 17/30* (2006.01)
*G06F 16/27* (2019.01)

(52) U.S. Cl.
CPC ....... *G06F 16/273* (2019.01); *G06Q 2220/10* (2013.01)

(58) Field of Classification Search
CPC ................. G06F 16/273; G06Q 2220/10
See application file for complete search history.

(56) References Cited

U.S. PATENT DOCUMENTS

| | | | |
|---|---|---|---|
| 9,253,075 B2 | 2/2016 | Jacobson et al. | |
| 9,298,669 B2 | 3/2016 | Westphal | |
| 9,298,757 B1* | 3/2016 | Ponvert | G06F 16/22 |
| 9,324,014 B1* | 4/2016 | Dixon | G06F 3/1238 |
| 9,449,024 B2* | 9/2016 | Shen | G06K 9/4652 |

(Continued)

OTHER PUBLICATIONS

D. Eppstein, M. Goodrich, F. Uyeda, G. Varghese, "What's the difference? Efficient set reconciliation without prior context," SIGCOMM 2011.

(Continued)

*Primary Examiner* — Greta L Robinson
(74) *Attorney, Agent, or Firm* — Naval Information Warfare Center, Pacific; Kyle Eppele; Ryan J. Friedl

(57) ABSTRACT

A method synchronizes related data across networked host devices. At each of a first and a second host device, string vectors are created for each document stored within the host device. The respective set of string vectors are encoded using a two-dimensional hash, where a first dimension of the two-dimensional hash stores string vector differences between all elements that reside in a symmetric difference and a second dimension of the two-dimensional hash stores one string vector from the symmetric difference. The respective encoded set of string vectors is transmitted to the other host device, which then decodes the respective encoded set of string vectors received to arrive at the symmetric difference. The host device determines which string vectors it is missing and requests from the other host device the missing documents pertaining to the missing string vectors. The missing documents are received by the requesting host device.

16 Claims, 5 Drawing Sheets

(56) References Cited

U.S. PATENT DOCUMENTS

| | | | |
|---|---|---|---|
| 2009/0006869 A1* | 1/2009 | Satya Sudhakar | G06F 21/6209 713/193 |
| 2013/0036091 A1* | 2/2013 | Provenzano | G06F 3/0604 707/624 |
| 2015/0154497 A1* | 6/2015 | Braziunas | G06F 16/93 706/12 |
| 2016/0092591 A1* | 3/2016 | Barouni Ebrahimi | G06F 16/93 707/709 |
| 2016/0307113 A1* | 10/2016 | Calapodescu | G06F 16/285 |
| 2017/0147575 A1* | 5/2017 | Pappu | G06F 16/2255 |

OTHER PUBLICATIONS

M. T. Goodrich and M. Mitzenmacher, "Invertible bloom lookup tables," ArXiv e-prints, 2011.

D. Guo and M. Li, "Set reconciliation via counting bloom filters," IEEE Trans. Knowledge and Data Eng., 2013.

M. Karpovsky, L. Levitin, and A. Trachtenberg, "Data verification and reconciliation with generalized error-control codes," IEEE Trans. Info. Theory, Jul. 2003.

T. Klove, B. Bose, and N. Elarief, "Systematic, single limited magnitude error correcting codes for flash memories," IEEE Trans. Info. Theory, Jul. 2011.

Y. Minsky and A. Trachtenberg, "Practical set reconciliation," Tech. Rep., Department of Electrical and Computer Engineering, Boston University, 2002.

Y. Minsky, A. Trachtenberg, R. Zippel, "Set reconciliation with nearly optimal communication complexity," IEEE Trans. Inform. Theory, 2003.

M. Fredman, M. Komlos, E. Szemeredi,"Storing a sparse table with O(1) worst case access time," Journal of ACM, vol. 31, No. 3, pp. 538-544, 1984.

V. Skachek, M. Rabbat, "Subspace synchronization: a network coding approach to object reconciliation," ISIT, 2014.

K. A. S. Abdel-Ghaffar; A. El Abbadi, "An optimal strategy for comparing file copies", IEEE Transactions on Parallel and Distributed Systems, 994, vol. 5, Issue: 1, pp. 87-93.

* cited by examiner

METHOD FOR RECONCILING SIMILAR DATA SETS

CROSS-REFERENCE TO RELATED APPLICATIONS

This application claims the benefit of U.S. Provisional Patent Application Ser. No. 62/351,717 filed Jun. 17, 2016, entitled "Method for Efficient Synchronization of Similar Data Sets", the content of which is fully incorporated by reference herein.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 103761.

BACKGROUND

A need exists for a method to efficiently synchronize data sets between network devices having related data stored therein. The need is particularly acute in disconnect, intermittent, and low-bandwidth environments.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein resolve the problem of synchronizing two sets of data where the size of the symmetric difference between the sets is small and, in addition, the elements in the symmetric difference are related through a metric such as the Hamming distance metric.

Figure 1:
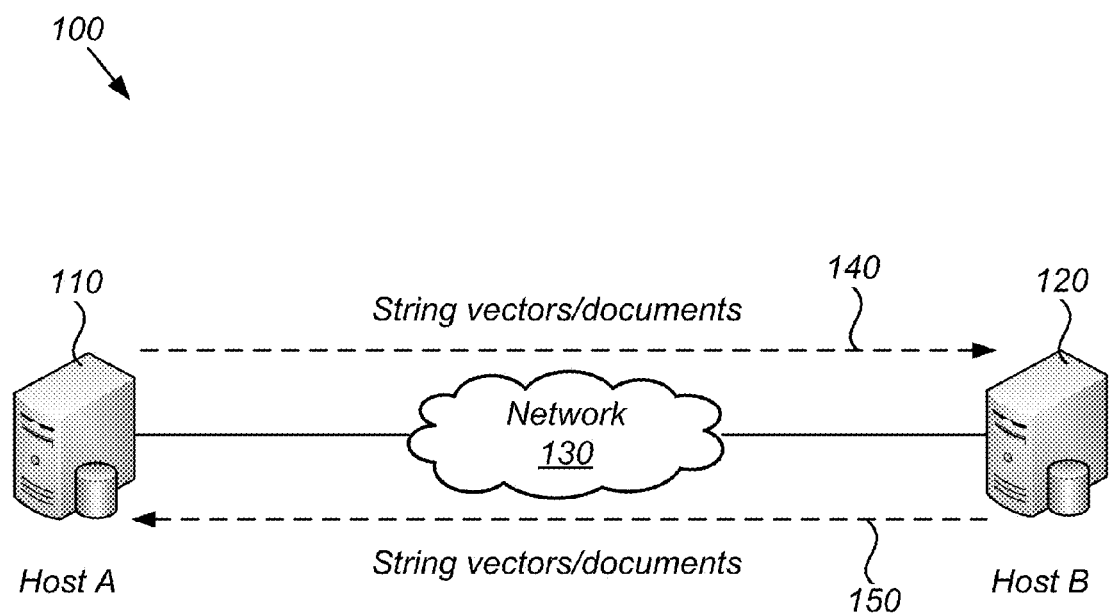
FIG. 1 shows a diagram illustrating an embodiment of a system configuration for use with the methods disclosed herein.
Figure 3:
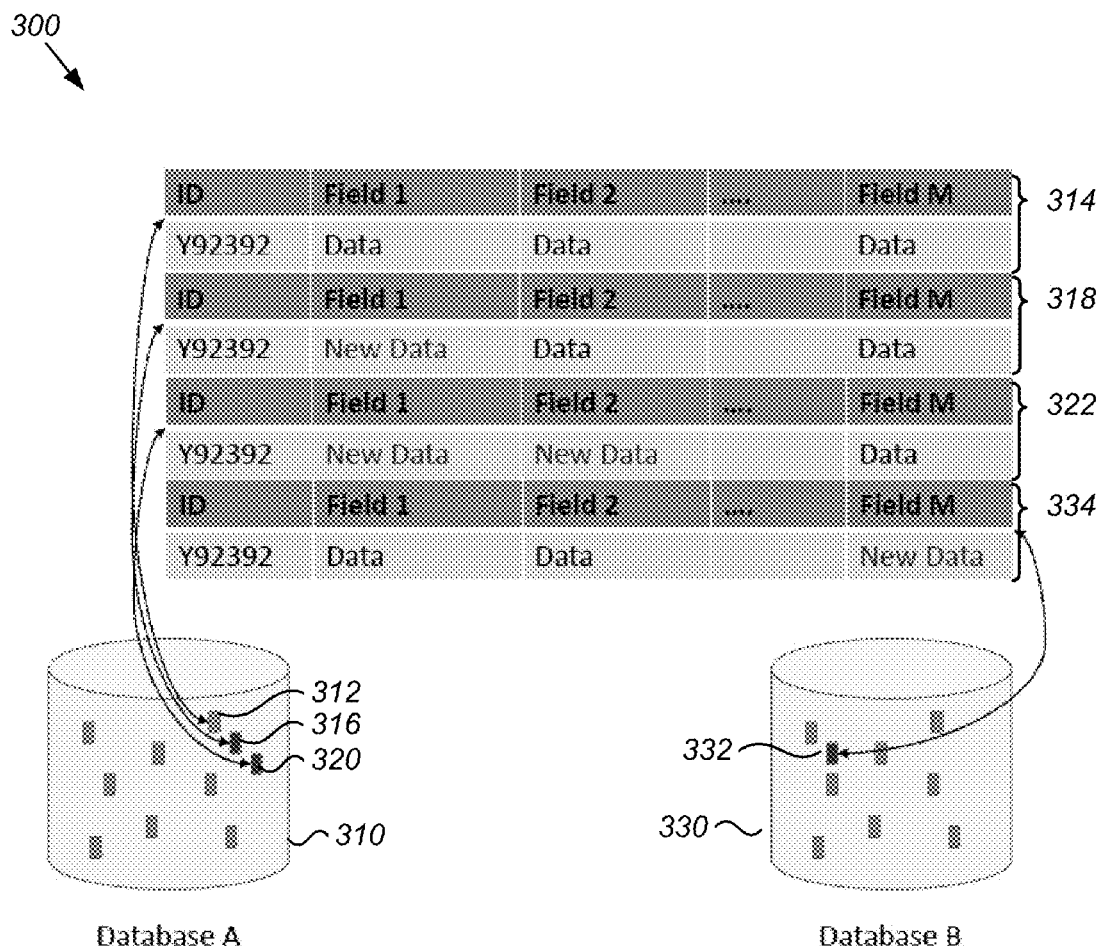
FIG. 3 shows a diagram illustrating updated data fields and corresponding documents stored in separate host devices.

FIG. 1 shows a diagram 100 illustrating an embodiment of a system configuration for use with the methods disclosed herein. Suppose two host devices, Host A 110 and Host B 120, each have a set of length-n q-ary strings, where n and q may comprise any positive integer. As used herein, the term "host" or "host devices" refers to any device that may be connected to a communications network 130, such as a local area network (LAN) or wide area network (WAN), and has a plurality of document/files stored therein, such as shown in FIG. 3. Examples of host devices include, but are not limited to switches, routers, servers, hubs, gateways, network interface controllers, modems, computers, mobile devices, and storage devices.

Figure 2:
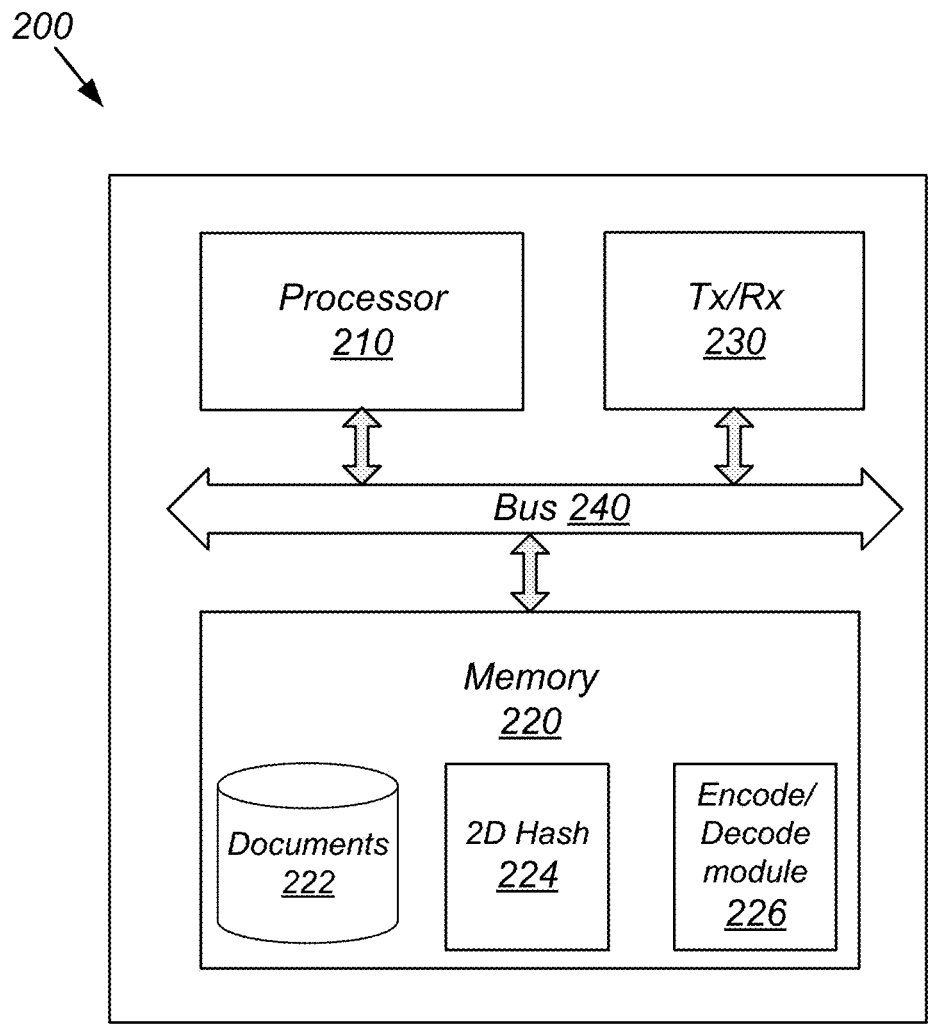
FIG. 2 shows a diagram illustrating an embodiment of a host device that may be used in the system shown in FIG. 1.

FIG. 2 shows a diagram illustrating an embodiment of a host device 200 that may be used in the system shown in FIG. 1. Device 200 includes a processor 210, memory 220, and transmit/receive device 230 connected to a bus 240. Memory 220 has a plurality of documents/files 222 stored therein, along with a two-dimensional hash 224 and software 224 for encoding and decoding. It should be recognized that memory 220 may further contain other software modules stored therein for performing some or all of the steps of the methods disclosed herein.

Let $S_A$ denote the set of strings on Host A 110 and let $S_B$ denote the set of strings on Host B 120. The set reconciliation problem is to determine the minimum information 140 and 150 that must be sent from Host A 110 to Host B 120 with a single round of communication so that Host A 110 and Host B 120 can compute their symmetric difference $S_A \Delta S_B = (S_A \backslash S_B) \cup (S_B \backslash S_A)$ where $|S_A \Delta S_B| \leq t$. Disclosed herein is a variant of the traditional set reconciliation problem whereby the elements in the symmetric difference $S_A \Delta S_B$ are related. In particular, some embodiments involve a setup where this symmetric difference can be partitioned into subsets such that elements in each of these subsets are within a certain Hamming distance of each other. The disclosed embodiments provide transmission schemes that minimize the amount of information exchanged between two hosts.

This model is motivated by the scenario where two hosts are storing a large number of documents/files, some or all of which may be large in file size. Under this setup, information is rarely or never deleted so that each database contains many different versions of the documents. Each document may have a fixed number of fields and each field may have a fixed size. When synchronizing sets of documents between two hosts, a set of hashes is produced for every document on both hosts. As an example, the hashes performed may include the CRC-32 redundancy check or the MD5 checksum. For every document, a single hash is then formed by concatenating in a systematic fashion the result of hashing each field of the document.

Suppose $h_a=(0, 9, 5, 4, 3) \in \mathbb{Z}_{10}^5$ is a non-binary string vector that is the result of performing the hash described above on document a. Suppose a single field on document a is updated resulting in the document a' and that $h_{a'}=(0, 9, 5, 4, 5) \in \mathbb{Z}_{10}^5$ is a non-binary string vector representing the hash for a'. By the previous discussion, $h_a$ and $h_{a'}$ differ only in the portion of $h_{a'}$ which corresponds to the field that was updated. Further, the Hamming distance between $h_a$ and $h_{a'}$ is one.

FIG. 3 shows a diagram 300 illustrating updated data fields and corresponding documents stored in separate host devices. A first host A may have a database A 310 having a plurality of documents stored therein, while a second host B may have a database B 330 having a plurality of documents stored therein. The documents stored in database A 310 and database B 330 are related in content, such as being different versions of the same document. In such different versions, only the data within the documents may vary in only one or a few fields.

The documents stored in database A 310 and database B 330 each have a fixed structure. For example, the documents may have a fixed number of fields such as Field 1 to Field M as shown. Further, the documents may contain images in addition to text. As an example, if the fields represent images, the hash may be run on the binary data representing the hash itself.

As shown, database A 310 has a document 312 stored therein, which corresponds to row 314 shown. Database A 310 further has a document 316 stored therein corresponding to row 318 and a document 320 stored therein corresponding to row 322. Database B 330 has a document 332 stored therein corresponding to row 334.

Document 316 differs in content from document 312 in that there is new data included within Field 1 of document 316 compared to document 312, as shown by the corresponding fields in rows 314 and 318. Document 320 differs in content from document 316 in that there is new content included within Field 2 of document 320 compared to document 316, as shown by the corresponding fields in rows 322 and 318. Document 320 further differs from document 312 in that document 320 contains new data in both Field 1 and Field 2 compared to document 312, as shown by the corresponding fields in rows 322 and 314. Document 332 differs in content from documents 312, 316, and 320 in that there is new data in Field M of document 332 compared to documents 312, 316, and 320, as shown by the corresponding fields in rows 334, 314, 318, and 322.

String vectors may be created for each document within the databases. String vectors may comprise any set of non-binary numbers. As an example, the string vectors comprise the output of concatenating hash functions together. For instance, if the document has the following name-value pairs ((ID, 2) (Location, 2)), and F is any hash function, then the string vector is (F(ID, 2), F(Location, 2)).

Figure 4:
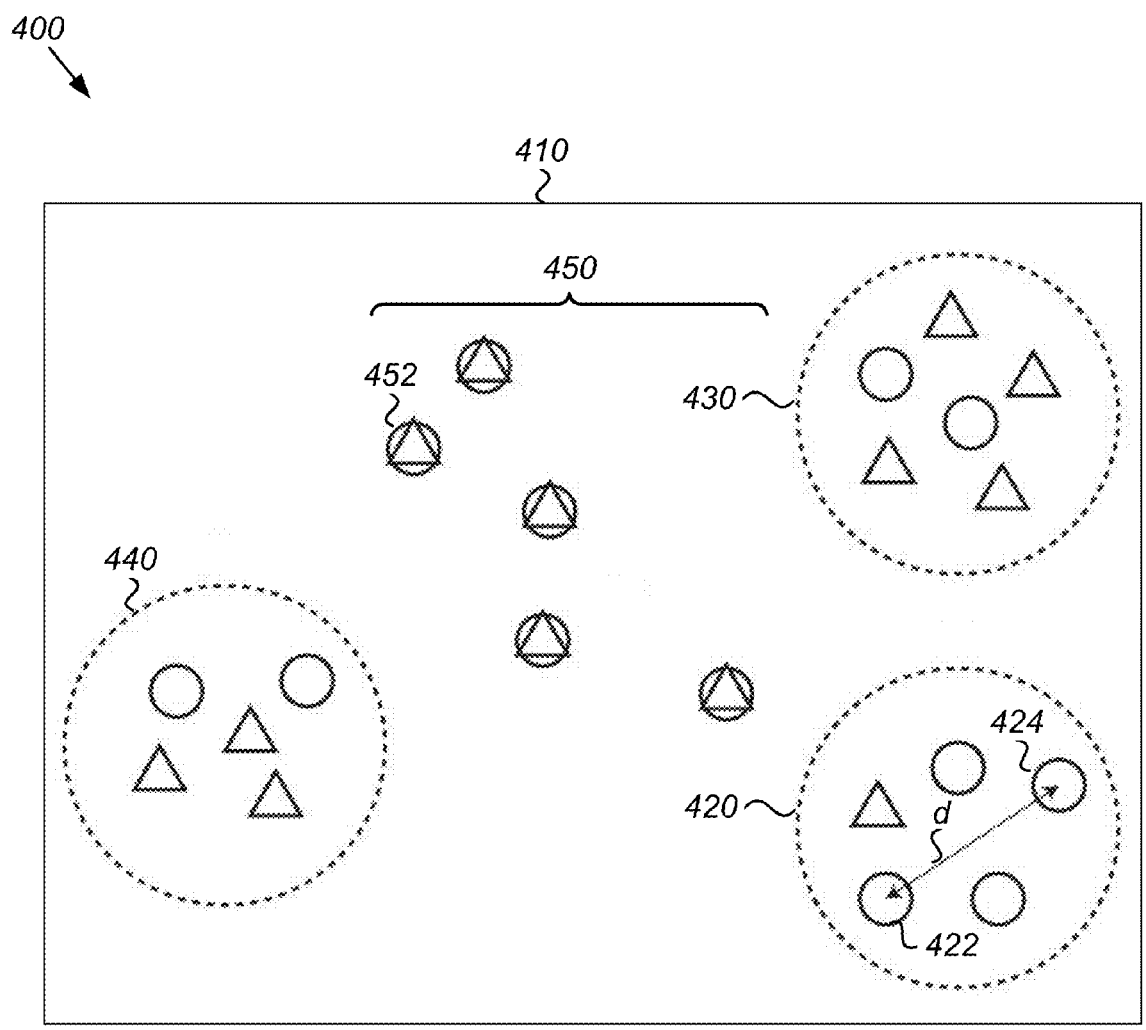
FIG. 4 shows a diagram illustrating a data set partitioned into subsets such that elements within each subset are within a specified distance of each other.

Motivated by this setup, the embodiments disclosed herein resolve the problem of reconciling sets of data elements, in particular where subsets of data elements in the symmetric difference are within a bounded Hamming distance from each other. FIG. 4 shows a diagram 400 illustrating a data set 410 which represents the symmetric difference, $S_A \Delta S_B$, between two host devices. The circles in data set 410 represent data from a first host, such as Host A 110, and the triangles represent data from a second host, such as Host B 120. Data set 410 is partitioned into subsets 420, 430, and 440, with each subset having at most six elements. It should be recognized that subsets may contain more or less than six elements depending upon the particular system configuration.

The fact that the elements in the symmetric difference can be partitioned into subsets is a property of the data that is being synchronized and it is a function of the fact that the documents are related. Within the subsets 420, 430, and 440, the separation of the data elements corresponds to how different in content the data is from each other. Data 450 is not partitioned into a subset, as the respective data elements from Host A 110 and Host B 120 do not differ, as shown for example by data elements 452, which are shown as an overlapping circle and triangle.

Using subset 420 as an example, any pair of data elements, such as data elements 422 and 424, are located within a specified Hamming distance d of each other. In some embodiments, the distance d may be specified in advance by a manufacturer or user/operator of the system. As an example, d may be a number less than four, such as three, but may be any number. If the Hamming distance between elements in the symmetric difference is lower, better compression is achieved.

For two strings $x, y \in \mathbb{Z}_q^a$, let $d_H(x,y)$ denote their Hamming distance. We denote the Hamming weight of x as wt(x). We assume q is a constant. Let $S_A \subseteq GF(q)^n$ and $S_B \subseteq GF(q)^n$. We say that $(S_A, S_B)$ are (t,h,1)-sets if $S_A \Delta S_B$ can be be written $S_A \Delta S_B = \{x_{1,1}, \ldots, x_{1,k1}\} \cup \{x_{2,1}, \ldots, x_{2,k2}\} \cup \ldots \cup \{x_{j,kj}, \ldots, x_{j,kj}\}$, where $j \leq t$, for $1 \leq i \leq j$, $k_i \leq h$, and for any $u,w \in \{x_{i,1}, \ldots, x_{i,ki}\}$, we have $d_H(u,w) \leq 1$. As an example, suppose $S_A, S_B \in GF(2)^5$ where $S_A = \{(0,0,0,0,0), (1,0,1,1,1)\}$ and $S_B \{(0,0,0,0,0), (1,1,0,0,1)\}$. Then we say that $(S_A, S_B)$ are (1,2,3)-sets since $S_A \Delta S_B = \{(1,0,1,1,1),(1,1,0,0,1)\}$ can be decomposed into 1 set of size 2 whereby the Hamming difference between any two elements is at most 3.

Disclosed herein are transmission schemes for the problem of reconciling (1,h,1)-sets, where $|S_A \Delta S_B| \leq h$ and for all $u,w \in S_A \Delta S_B$, we have $d_H(u,w) \leq 1$. Discussed below is the encoding procedure that is performed on Host A. Also discussed is the decoding procedure, which is performed on Host B. The goal, after the decoding procedure, is to compute $S_A \Delta S_B$ where $(S_A, S_B)$ are (1,h,1)-sets consisting of elements from $GF(q)^n$.

The idea behind the encoding and decoding is to encode the symmetric difference $S_A \Delta S_B$ by specifying one element say $X \in S_A \Delta S_B$ and then specifying the remaining elements in $S_A \Delta S_B$ by describing their location relative to X As a result, as will be described shortly, the information transmitted from Host A to Host B can be decomposed into two parts denoted $w_1$ and $w_2$. The information in the $w_1$ part describes the locations of the elements in $S_A \Delta S_B$ relative to X. The information in the $w_2$ part will be used to fully recover X. Once X is known and the locations of the other elements in $S_A \Delta S_B$ are known relative to X, then the symmetric difference $S_A \Delta S_B$ can be recovered.

Some useful notation is first introduced. An $[n,d]_q$ code is a linear code over GF(q) of length n with minimum Hamming distance d. Suppose r is a positive integer where r<n. Let $\alpha$ be a primitive element in GF(q') where q is prime. Furthermore, let H be an r×n matrix with elements from GF(q). Suppose $S=\{x_1, x_2, \ldots, x_s\} \subseteq GF(q)^n$. For shorthand, we denote the set $\{H \cdot x_1, H \cdot x_2, \ldots, H \cdot x_s\}$ as H·S. We define $S_{H,i}$ where $1 \leq i \leq q'$ so that $S_{H,i} = \{x \in S : H \cdot x = \alpha^i\}$, where with an abuse of notation, $\alpha^{qr}=0$. We refer to the j-th element in $S_{H,i}$, when ordered in lexicographic order, as $S_{H,i,j}$.

Finally, let $I_H: \{GF(q)^n\} \to \mathbb{Z}_{q^r}^{q^r}$ be defined as $I_H(S)=(|S_{H,1}|, |S_{H,2}|, \ldots, |S_{H,q^r-1}|, |S_{H,0}|)$, for $S \subseteq \{GF(q)^n\}$. The following example is provided for illustration.

Suppose $q=2, n=3, S=\{(0,0,0), (1,1,0), (1,0,1), (0,0,1)\}$, and $$H_1 = \begin{pmatrix} 1 & 0 & 1 \\ 0 & 1 & 1 \end{pmatrix}.$$

Representing the elements of GF(4) as $\alpha^1=(0,1)^T, \alpha^2=(1,1)^T, \alpha^3=(1,0)$, and $\alpha^4=(0,0)^T$, we have $I_{H1}(S)=(1,2,0,1)$. In this case, $S_{H1,1}=\{(1,0,1)\}$, $S_{H1,2}=\{(0,0,1),(1,1,0)\}$, $S_{H1,4}=\{(0,0,0)\}$, and $S_{H1,2,2}=(1,1,0)$. To describe the encoding (and subsequent decoding) procedure, the following matrices are used:

1) $H \in GF(q)^{r \times n}$, for some positive integer r, is the parity check matrix for an $[n,2^l+1]_q$ code $C_l$;

2) $H1 \in GF(2)u \times qr$, for some positive integer u, is the parity check matrix for an $[q^r, 2h+1]_2$ code $C_1$;

3) $H_F \in GF(q)^{n \times n}$, and $H^- \in GF(q)^{(n-r) \times n}$ are such that $$H_F = \begin{pmatrix} H_\ell \\ \overline{H}_\ell \end{pmatrix}$$

has full rank.

In addition to the matrix $H^-_l$, one more tool is required to encode $w_2$. Some additional notation is first introduced. Let $b=(b_1, b_2, \ldots, b_m)$ be a sequence of length m with elements from $GF(q^{n-r})$ such that for any positive integer k where $k \le s$ $\sum_{j=1}^k a_j b_{i_j} \ne 0$ where $1 \le i_1 < i_2 < \ldots < i_k \le m$ are distinct and $\{a_1, a_2, \ldots, a_k\} \subseteq \{-1,1\}$. Then, the sequence b is referred to as a $B_s$ sequence. Notice that a $B_s$ sequence can be formed from the columns of a parity check matrix for an $[m,d]_q$ code with dimension $n-(n-r)$ provided $d \ge s+1$.

Discussed below is an embodiment of the encoding procedure followed by the decoding procedure. For encoding, the following procedure may be performed on both Host A and Host B. For shorthand, the set $S_A$ or $S_B$ is referred to as S. The operations in step 3) take place over the field $GF(q^{n-r})$ where $n-r \ge r$ and also that $m > q^r$ where $b=(b_1, b_2, \ldots, b_m)$ is a $B_h$ sequence.

1) Let $z = I_{H'}(S) \mod 2$;
2) Define $w_1 = H_1 \cdot z$; and

3) Let $w_2 = \sum_{i=1}^{q^r} b_i \cdot \sum_{j=1}^{|S_{H_\ell,i}|} \overline{H}_\ell \cdot S_{H_\ell,i,j}.$ The information $(w_1, w_2)$ is then transmitted from the host device performing the encoding to the other host device.

For decoding, suppose $(w_1^A, w_2^A)$ is the information transmitted by Host A to Host B and suppose $(w_1^B, w_2^B)$ is the result of the encoding procedure if it is performed on Host B. Next, it is illustrated how to recover $S_A \Delta S_B$ given $(w_1^A, w_2^A), (w_1^B, w_2^B)$. The decoding procedure has two broad stages. In the first stage, the locations of the elements in $S_A \Delta S_B$ relative to some $X \in S_A \Delta S_B$ are determined. In the second stage, the element X is recovered. The decoding begins by first recovering the syndromes of the elements in the set $S_A \Delta S_B$. More precisely, as a result of the error correction ability of the code with a parity check matrix $H_1$, the set $S_S = \{H_L \cdot y : y \in S_A \Delta S_B\}$ is first recovered. Next, an element is arbitrarily chosen, say $X_S \in S_S$. Given this setup, X (described earlier) is precisely equal to the element in X which maps to $X_S$ under the map $H_L$ so that $X = X \in S_A \Delta S_B$: $X_S = X \cdot H_L$.

To determine the locations of the other elements in $S_A \Delta S_B$ relative to X every element in the set $S_S$ is added to $X_S$. Let $S_L = \{Y_S + X_S : Y_S \in S_S\}$. As will be described below in more detail from the set $S_L$, the values of the elements in $S_A \Delta S_B$ relative to X can be determined. Next, the value of X is determined by canceling out some of the contributions of the elements in $(S_A \Delta S_B) \setminus X$ from the vector $w_2$.

Suppose $D1: GF(2)u \to GF(2)qr$ is the decoder for the code $C_1$ which by assumption has minimum Hamming distance at least $2h+1$. $D_1$ takes as input a syndrome and outputs an error vector with Hamming weight at most h. Let $D_l: GF(q)^r \to GF(q)^n$ be the decoder for $C_L$, which has Hamming distance $2l+1$. The decoder $D_l$ takes as input a syndrome and outputs an error vector with Hamming weight at most l. In the following, $\alpha$ is a primitive element of $GF(q^r)$.

1) Let $\hat{z} = \mathcal{D}_1(w_1^A + w_1^B)$.
2) Suppose $\hat{z}$ has is in positions $\{k_1, k_2, \ldots, k_\nu\}$. If $\hat{z} = 0$, then let $F = \emptyset$, and stop.
3) Define $\hat{e}_2 = D_l(\alpha^{k1} + \alpha^{k2})$, $\hat{e}_3 = D_l(\alpha^{k1} + \alpha^{k3})$, $\ldots$, $\hat{e}_\nu = D_l(\alpha^{k1} + \alpha^{k\nu})$.
4) Let $z' = w_2^A + w_2^B + \sum_{i=2}^r b_{k_i} \cdot \overline{H}_l \cdot \hat{e}_i$.
5) Define $s_2 = z'/(b_{k1} + b_{k2} + \ldots + b_{k\nu})$.
6) Let $\hat{x} = H_F^{-1} \cdot (\alpha^{k1}, s_2)^T$.
7) $F = \{\hat{x}, \hat{x} + \hat{x}_2, \ldots, \hat{x} + \hat{e}_\nu\}$.

Discussed below is an example illustrating the encoding and decoding procedures.

1) Setup: Suppose Host A has the set $S_A = \{(1,1,1,0,0,0,1), (1,1,0,0,1,1,0), (1,0,0,0,0,1,1), (0,0,0,1,0,0,1)\}$, and Host B has the set $S_B = \{(1,1,1,0,0,0,1), (1,1,0,0,1,1,0), (1,0,0,0,0,1,1), (1,0,0,1,0,0,1)\}$. In this case, $S_A \Delta S_B = \{(0,0,0,1,0,0,1), (1,0,0,1,0,0,1)\}$ and $d_H((0,0,0,1,0,0,1), (1,0,0,1,0,0,1)) = 1$ so that $(S_A, S_B)$ are $(1,2,1)$-sets. In this case $x = (0,0,0,1,0,0,1) \in S_A \setminus S_B$ and $y = (1,0,0,1,0,0,1) \in S_B \setminus S_A$.

2) Encoding: We let $z^A$, $z^B$ be the result of performing step 1) on Hosts A and B respectively. Similarly let $w_1^A$, $w_1^B$, $w_2^A$, $w_2^B$ be the result of performing steps 2) and 3) on Hosts A and B respectively. Suppose $\zeta$ is a primitive element of GF(8) and $\beta$ is a primitive element of GF(16) where we use the primitive polynomial $x^3+x+1$ to represent elements over GF(8) as binary vectors and we use the primitive polynomial $x^4+x+1$ to represent the elements over GF(16) as binary vectors.

The following matrices may be used:

$$H_l = \zeta \zeta^2 \zeta^3 \zeta^4 \zeta^5 \zeta^6 \zeta^7) = \begin{pmatrix} 0 & 1 & 0 & 1 & 1 & 1 & 0 \\ 1 & 0 & 1 & 1 & 1 & 0 & 0 \\ 0 & 0 & 1 & 0 & 1 & 1 & 1 \end{pmatrix}$$

is the parity check matrix for an $[8,3]_2$ code. This matrix plays the same role as the matrix $H_1$ described in the encoding procedure.

$$\text{Let } H_1' = \begin{pmatrix} 1 & 0 & 0 & 0 & 1 & 0 & 0 & 1 \\ 0 & 1 & 0 & 0 & 1 & 0 & 0 & 1 \\ 0 & 0 & 1 & 0 & 1 & 0 & 0 & 1 \\ 0 & 0 & 0 & 1 & 1 & 0 & 0 & 0 \\ 0 & 0 & 0 & 0 & 0 & 1 & 0 & 1 \\ 0 & 0 & 0 & 0 & 0 & 0 & 1 & 1 \end{pmatrix}.$$

In this case, $H'_1$ is analogous to the matrix $H_1$ described in the encoding procedure. Notice that $H'_1$ is a parity check matrix for an $[8,5]_2$ code. Let $$\overline{H}_\ell = (\beta^{10} \quad \beta^7 \quad \beta^{14} \quad \beta^{12} \quad \beta^8 \quad \beta^{13} \quad \beta^4) = \begin{pmatrix} 0 & 1 & 1 & 1 & 0 & 1 & 0 \\ 1 & 0 & 0 & 1 & 1 & 1 & 0 \\ 1 & 1 & 0 & 1 & 0 & 0 & 1 \\ 1 & 1 & 1 & 1 & 1 & 1 & 1 \end{pmatrix}$$

and note that $$\begin{pmatrix} H_\ell \\ \overline{H}_\ell \end{pmatrix}$$

has full rank as desired. The $B_2$ sequence $b=(\beta,\beta^2,\ldots,\beta^{15})$ is used for the example.

At step 1) of the encoding, $z^A=(0,2,0,1,1,0,0,0)$ mod $2=(0,0,0,1,1,0,0,0)$ and $z^B=(0,2,0,1,0,1,0,0)$ mod $2=(0,0,0,1,0,1,0,0)$ so that $z^A+z^B=(0,0,0,0,1,1,0,0)$. At step 2) of the encoding, $w_1^A=(1,1,1,0,0,0)$ and $w_1^B=(0,0,0,1,1,0)$. At step 3) of the encoding $w_2^A=\beta^2\cdot\beta^5+\beta^2\cdot\beta^2+\beta^4\cdot\beta^{14}+\beta^5\cdot\beta^6$. Similarly $w_2^B=\beta^2\cdot\beta^5+\beta^2\cdot\beta^2+\beta^4\cdot\beta^{14}+\beta^6\cdot\beta^7$.

3) Decoding: The decoding is performed on Host B and the information $(w_1^A, w_2^A)$, $(w_1^B, w_2^B)$, and $S_B$ is known. Let $D_l$ be the decoder for the code with a parity check matrix $H_l$ and suppose $D'_1$ is the decoder for the code with a parity check matrix $H'_1$. At step 1) of the decoding, $z=D'_1 (w_1^B+w_1^A)=(0,0,0,0,1,1,0,0)=z^A+z^B$ as desired. In this case z has 1 s in positions $\zeta^5$ and $\zeta^6$ so we let $k_1=6$ and $k_2=5$.

At step 3) of the decoding, $\hat{e}=D_l(\zeta^5+\zeta^6)=D_l(\zeta^1)=(1,0,0,0,0,0,0)=x+y$. Now at step 4), we have $z^0=w_2+w_2^B+\beta^5\cdot\overline{H}_k\cdot\hat{e}=\beta^5\cdot\beta^6+\beta^6\cdot\beta^7+\beta^5\cdot\beta^{10}=\beta^7\cdot(\beta^4+\beta^6+\beta^8)=\beta^7\cdot(\beta^5+\beta^6)$. At step 5) of the decoding, we now have $$s^2 = \frac{z}{\beta^5+\beta^0} = \beta^7.$$

At step 6), we find that $\hat{y}=(1,0,0,1,0,0,1)$ since $H_l\hat{y}=\zeta^6$ and $\overline{H}_l\hat{y}=s_2=\beta^7$ as desired. Then, at step 7), $F=\{(1,0,0,1,0,0,1), (0,0,0,1,0,0,1)\}$.

Under the procedure described above, 10 bits of information have been transmitted between Host A and B. Alternative methods used require at least 14 bits of information exchange. Less information is transmitted because the method encodes the differences between the elements in the symmetric difference along with only one element in the symmetric difference, rather than encoding all elements in the symmetric difference. Thus, the disclosed embodiments allow for a more efficient transmittal of information between networked devices, which is especially useful in DIL network environments.

Figure 5:
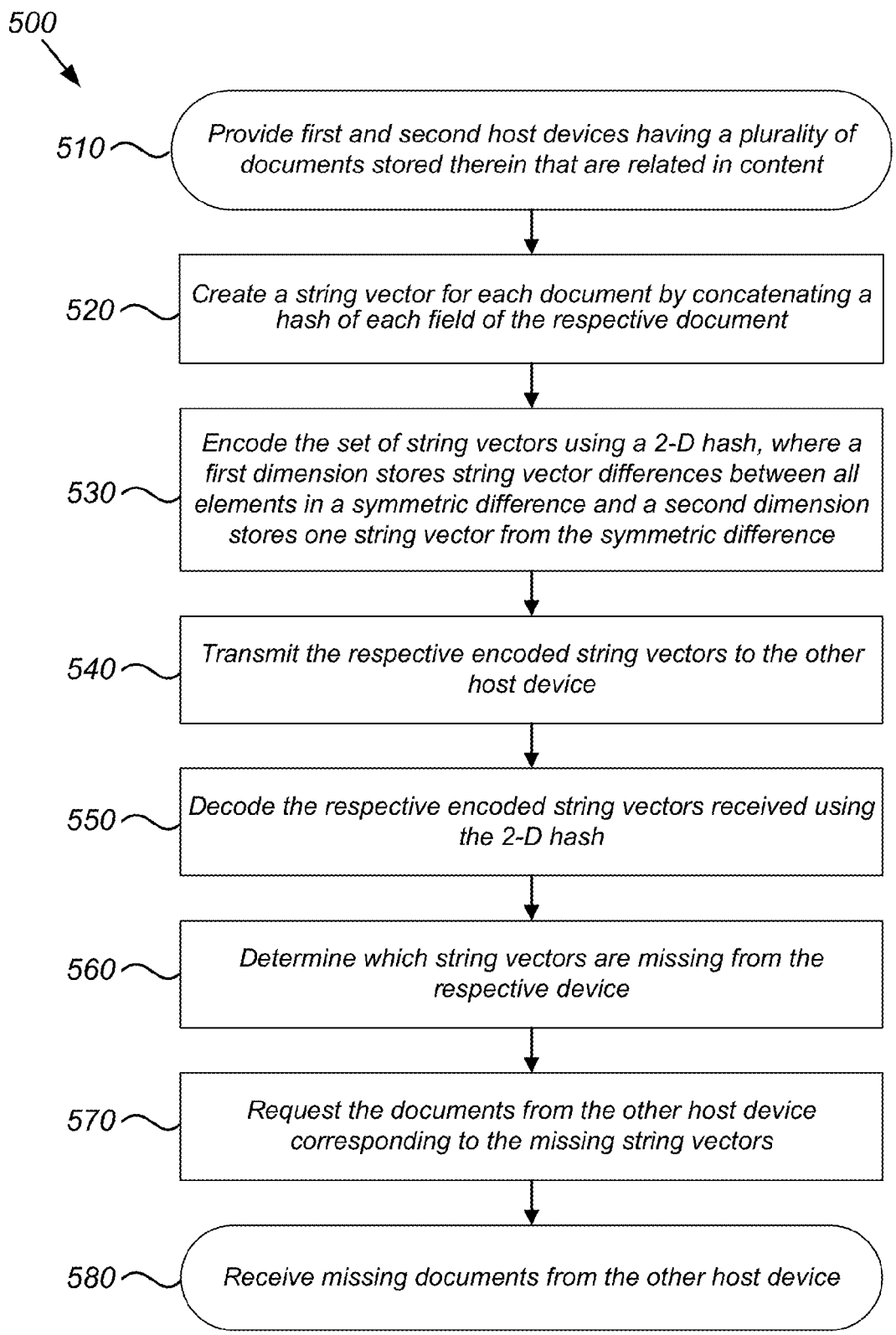
FIG. 5 shows a flowchart of an embodiment of a method in accordance with the methods disclosed herein.

FIG. 5 shows a flowchart of an embodiment of a method 500 in accordance with the methods disclosed herein. As an example, method 500 may be performed by system 100 as shown in FIG. 1 using devices 200 as shown in FIG. 2. Also, while FIG. 5 shows one embodiment of method 500 to include steps 510-580, other embodiments of method 500 may contain fewer or more steps. Further, while in some embodiments the steps of method 500 may be performed as shown in FIG. 5, in other embodiments the steps may be performed in a different order, or certain steps may occur simultaneously with one or more other steps.

Method 500 may begin with step 510, which involves providing a first host device 110 connected to a second host device 120 via a communication network 130, the first host device 110 and the second host device 120 each having a plurality of documents stored therein (see documents 222 in FIG. 2 and document within Database A 310 and Database B 330 in FIG. 3). In some embodiments, each of the documents has a fixed number of fields, such as shown in rows 314, 318, 322, and 324 in FIG. 3. The content of the documents stored within the first host device 110 is related to content of the documents stored within the second host device 120. In some embodiments the content of the documents stored within the first host device 110 is related to content of the documents stored within the second host device 120 by a version number, as such documents are earlier/later versions of one another. In some embodiments, each of the documents has a fixed number of fields and each of the fields has a fixed size, such as the "ID" field rows 314, 318, 322, and 324 in FIG. 3. Each of the first host device 110 and the second host device 120 are each configured, via a processor 210 configured to run the appropriate software modules or instructions therein, to perform the steps as discussed below.

Step 520 involves creating a string vector for each document contained therein. The string vector is formed by concatenating a hash of each field of the respective document, where $S_a$ is a set of string vectors for the plurality of documents stored on the first host device 110 and $S_b$ is a set of string vectors for the plurality of documents stored on the second host device 120. In some embodiments, the string vectors are non-binary string vectors, as discussed in the example above.

Step 530 involves encoding, using encode/decode module 226 shown in FIG. 2, the respective set of string vectors $S_a$ or $S_b$ using a two-dimensional hash 224, where a first dimension, $w_1$, of the two-dimensional hash stores string vector differences between all elements that reside in a symmetric difference, $S_a \Delta S_b$, and a second dimension, $w_2$, of the two-dimensional hash stores one string vector from $S_a \Delta S_b$.

In some embodiments, $w_1$ is determined according to the equation $w_1 = H_1 \cdot z$, where $z = I_{H_l}(S)$, wherein set S is a subset of $F_q^n$ and represents a set of string vectors on either the first host device 110 or the second host device 120, where a matrix $H_l \in F_q^{r \times n}$ is a parity check matrix for a q-ary code of length n with minimum Hamming distance $2l+1$, where if $B_r(i)$ represents an r-bit binary expansion of an integer i, vector $I_{H_l}(S)$ is formed such that an i-th entry of $I_{H_l}(S)$ is $|\{v \subset S : H_l \cdot v = B_r(i)\}|$ mod 2, where a matrix $H_1 \in F_2^{u \times q^r}$ is a parity check matrix for a code over $F_2$, which has minimum Hamming distance $2h+1$.

In some embodiments, $w_2$ is determined according to the equation $$w_2 = \sum_{i=1}^{q^r} b_i \cdot \sum_{j=1}^{|S_{H_l,i}|} \overline{H}_l \cdot S_{H_l,i,j},$$

where matrix $$H_F = \begin{pmatrix} H_l \\ \overline{H}_l \end{pmatrix} \in F_q^{n \times n}$$

has full rank and $\overline{H}_l \in F_q^{(n-r) \times r}$ where a sequence $b=(b_1, b_2, \ldots, b_m) \in F_q^{n-r}$ is such that for any vector $a=(a_1, a_2, \ldots, a_m) \in \{-1,0,1\}$ with at most s non-zero components $a \cdot b^T = 0$ if and only if a is equal to an all-zeros sequence, wherein set $S_{H_l,i} = |\{v \in H_l \cdot v = B_r(i)\}|$ and a j-th element of $S_{H_l,i}$, when ordered lexicographically, is denoted $S_{H_l,j}$.

Step 540 involves transmitting, using transmitter/receiver 230, the respective encoded set of string vectors $S_a$ or $S_b$ to the other of the first host device 110 and the second host device 120, such as shown by arrows 140 and 150 in FIG. 1. Step 550 involves decoding, using encode/decode module 226 shown in FIG. 2, the respective encoded set of string vectors $S_a$ or $S_b$ received from the other of the first host device 110 and the second host device 120. The decoding comprises using $w_1$ to determine the string vector differences between all elements that reside in $S_a \Delta S_b$, recovering one string vector in $S_a \Delta S_b$ using $w_2$, and using the determined string vector differences between all elements that reside in $S_a \Delta S_b$ and the recovered one string vector to determine $S_a \Delta S_b$.

Step 560 involves determining, using processor 210, at each of the respective first host device and the second host device using information from $S_a \Delta S_b$, which string vectors are missing from the respective first host device and the second host device, such as by comparing the string vectors with those stored on the host device. Step 570 involves requesting, using processor 210 and transmitter/receiver 230, missing documents pertaining to the missing string vectors from the other of the first host device 110 and the second host device 120. Step 580 involves receiving, shown by arrows 140 and 150 in FIG. 1, the requested missing documents pertaining to the missing string vectors from the other of the first host device and the second host device using information from $S_a \Delta S_b$.

Method 500 may be implemented as a series of modules, either functioning alone or in concert, with physical electronic and computer hardware devices. Method 500 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the disclosed embodiments are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:

providing a first host device connected to a second host device via a communication network, the first host device and the second host device each having a plurality of documents stored therein each having a fixed number of fields, wherein content of the documents stored within the first host device is related through a Hamming distance metric to content of the documents stored within the second host device, wherein the first host device and the second host device are each configured to perform the steps of:

creating a string vector for each document contained therein, wherein the string vector is formed by concatenating a hash of each field of the respective document, where $S_a$ is a set of string vectors for the plurality of documents stored on the first host device and $S_b$ is a set of string vectors for the plurality of documents stored on the second host device;

encoding the respective set of string vectors $S_a$ or $S_b$ using a two-dimensional hash, where a first dimension, $w_1$, of the two-dimensional hash stores string vector differences between all elements that reside in a symmetric difference, $S_a \Delta S_b$, and a second dimension, $w_2$, of the two-dimensional hash stores one string vector from $S_a \Delta S_b$;

transmitting the respective encoded set of string vectors $S_a$ or $S_b$ to the other of the first host device and the second host device;

decoding the respective encoded set of string vectors $S_a$ or $S_b$ received from the other of the first host device and the second host device, wherein the decoding comprises using $w_1$ to determine the string vector differences between all elements that reside in $S_a \Delta S_b$, recovering one string vector in $S_a \Delta S_b$ using $w_2$, and using the determined string vector differences between all elements that reside in $S_a \Delta S_b$ and the recovered one string vector to determine $S_a \Delta S_b$;

determining, at each of the respective first host device and the second host device using information from $S_a \Delta S_b$, which string vectors are missing from the respective first host device and the second host device; and requesting missing documents pertaining to the missing string vectors from the other of the first host device and the second host device.

2. The method of claim 1, wherein $w_1$ is determined according to the equation $w_1 = H_1 \cdot z$, where $z = I_{H_l}(S)$, wherein set S is a subset of $F_q^n$ and represents a set of string vectors on either the first host device or the second host device, where a matrix $H_l \in F_q^{r \times n}$ is a parity check matrix for a q-ary code of length n with minimum Hamming distance $2l+1$, where if $B_r(i)$ represents an r-bit binary expansion of an integer i, vector $I_{H_l}(S)$ is formed such that an i-th entry of $I_{H_l}(S)$ is $|\{v \in S: H_l \cdot v = B_r(i)\}|$ mod 2, where a matrix $H_1 \in F_2^{u \times q^r}$ is a parity check matrix for a code over $F_2$, which has minimum Hamming distance $2h+1$.

3. The method of claim 1, wherein $w_2$ is determined according to the equation $$w_2 = \sum_{i=1}^{q^r} b_i \cdot \sum_{j=1}^{|S_{H_l,i}|} \overline{H}_l \cdot S_{H_l,i,j},$$

where matrix $$H_F = \begin{pmatrix} H_l \\ \overline{H}_l \end{pmatrix} \in F_q^{n \times n}$$

has full rank and $\overline{H}_l \in F_q^{(n-r) \times r}$, where a sequence $b=(b_1, b_2, \ldots, b_m) \in F_q^{n-r}$ is such that for any vector $a=(a_1, a_2, \ldots, a_m) \in \{-1,0,1\}$ with at most s non-zero components $a \cdot b^T = 0$ if and only if a is equal to an all-zeros sequence, wherein set $S_{H_l,i} = |\{v \in S: H_l \cdot v = B_r(i)\}|$ and a j-th element of $S_{H_l,i}$, when ordered lexicographically, is denoted $S_{H_l,i,j}$.

4. The method of claim 1, wherein the string vectors are non-binary string vectors.

5. The method of claim 1 further comprising the step of receiving the requested missing documents pertaining to the missing string vectors from the other of the first host device and the second host device using information from $S_a \Delta S_b$.

6. The method of claim 1, wherein the content of the documents stored within the first host device is related to content of the documents stored within the second host device by a version number.

7. The method of claim 1, wherein each of the fields has a fixed size.

8. A method comprising the steps of:
providing a first host device connected to a second host device via a communication network, the first host device and the second host device each having a plurality of documents stored therein each having a fixed number of fields, wherein content of the documents stored within the first host device is related through a Hamming distance metric to content of the documents stored within the second host device, wherein the first host device and the second host device are each configured to perform the steps of:
creating a string vector for each document contained therein, wherein the string vector
is formed by concatenating a hash of each field of the respective document, where $S_a$ is a set
of string vectors for the plurality of documents stored on the first host device and $S_b$ is a set of string vectors for the plurality of documents stored on the second host device;
encoding the respective set of string vectors $S_a$ or $S_b$ using a two-dimensional hash, where a first dimension, $w_1$, of the two-dimensional hash stores string vector differences between all elements that reside in a symmetric difference, $S_a \Delta S_b$, and a second dimension, $w_2$, of the two-dimensional hash stores one string vector from $S_a \Delta S_b$, wherein $w_1$ is determined according to the equation $w_1 = H_1 \cdot z$, where $z = I_{H_l}(S)$, wherein set S is a subset of $F_q^n$ and represents a set of string vectors on either the first host device or the second host device, where a matrix $H_l \in F_q^{r \times n}$ is a parity check matrix for a q-ary code of length n with minimum Hamming distance $2l+1$, where if $B_r(i)$ represents an r-bit binary expansion of an integer i, vector $I_{H_l}(S)$ is formed such that an i-th entry of $I_{H_l}(S)$ is $|\{v \in S: H_l \cdot v = B_r(i)\}|$ mod 2, where a matrix $H_1 \in F_2^{u \times q^r}$ is a parity check matrix for a code over $F_2$, which has minimum Hamming distance $2h+1$, wherein $w_2$ is determined according to the equation $$w_2 = \sum_{i=1}^{q^r} b_i \cdot \sum_{j=1}^{|S_{H_l,i}|} \overline{H}_l \cdot S_{H_l,i,j},$$

where matrix $$H_F = \begin{pmatrix} H_l \\ \overline{H}_l \end{pmatrix} \in F_q^{n \times n}$$

has full rank and $\overline{H}_l \in F_q^{(n-r) \times r}$, where a sequence $b=(b_1, b_2, \ldots, b_m) \in F_q^{n-r}$ is such that for any vector $a=(a_1, a_2, \ldots, a_m) \in \{-1,0,1\}$ with at most s non-zero components $a \cdot b^T = 0$ if and only if a is equal to an all-zeros sequence, wherein set $S_{H_l,i} = |\{v \in S: H_l \cdot v = B_r(i)\}|$ and a j-th element of $S_{H_l,i}$, when ordered lexicographically, is denoted $S_{H_l,i,j}$;
transmitting the respective encoded set of string vectors $S_a$ or $S_b$ to the other of the first host device and the second host device;
decoding the respective encoded set of string vectors $S_a$ or $S_b$ received from the other of the first host device and the second host device, wherein the decoding comprises using $w_1$ to determine the string vector differences between all elements that reside in $S_a \Delta S_b$, recovering one string vector in $S_a \Delta S_b$ using $w_2$, and using the determined string vector differences between all elements that reside in $S_a \Delta S_b$ and the recovered one string vector to determine $S_a \Delta S_b$;
determining, at each of the respective first host device and the second host device using information from $S_a \Delta S_b$, which string vectors are missing from the respective first host device and the second host device; and
requesting missing documents pertaining to the missing string vectors from the other of the first host device and the second host device.

9. The method of claim 8, wherein the string vectors are non-binary string vectors.

10. The method of claim 8 further comprising the step of receiving the requested missing documents pertaining to the missing string vectors from the other of the first host device and the second host device using information from $S_a \Delta S_b$.

11. The method of claim 8, wherein the content of the documents stored within the first host device is related to content of the documents stored within the second host device by a version number.

12. The method of claim 8, wherein each of the fields has a fixed size.

13. A system comprising:
a first host device connected to a second host device via a communication network, the first host device and the second host device each having a plurality of documents stored therein each having a fixed number of fields having a fixed size, wherein content of the documents stored within the first host device is related through a Hamming distance metric to content of the documents stored within the second host device, wherein the first host device and the second host device each have a processor therein configured to perform the steps of:

creating a non-binary string vector for each document contained therein, wherein the string vector is formed by concatenating a hash of each field of the respective document, where $S_a$ is a set of string vectors for the plurality of documents stored on the first host device and $S_b$ is a set of string vectors for the plurality of documents stored on the second host device;

encoding the respective set of string vectors $S_a$ or $S_b$ using a two-dimensional hash, where a first dimension, $w_1$, of the two-dimensional hash stores string vector differences between all elements that reside in a symmetric difference, $S_a \Delta S_b$, and a second dimension, $w_2$, of the two-dimensional hash stores one string vector from $S_a \Delta S_b$, wherein $S_a \Delta S_b$ is partitioned into subsets such that elements in each of the subsets are within a specified Hamming distance of each other;

transmitting the respective encoded set of string vectors $S_a$ or $S_b$ to the other of the first host device and the second host device;

decoding the respective encoded set of string vectors $S_a$ or $S_b$ received from the other of the first host device and the second host device, wherein the decoding comprises using $w_1$ to determine the string vector differences between all elements that reside in $S_a \Delta S_b$, recovering one string vector in $S_a \Delta S_b$ using $w_2$, and using the determined string vector differences between all elements that reside in $S_a \Delta S_b$ and the recovered one string vector to determine $S_a \Delta S_b$;

determining, at each of the respective first host device and the second host device using information from $S_a \Delta S_b$, which string vectors are missing from the respective first host device and the second host device; and requesting missing documents pertaining to the missing string vectors from the other of the first host device and the second host device.

14. The system of claim 13, wherein $w_1$ is determined according to the equation $w_1 = H_1 \cdot z$, where $z = I_{H_l}(S)$, wherein set S is a subset of $F_q^n$ and represents a set of string vectors on either the first host device or the second host device, where a matrix $H_l \in F_q^{r \times n}$ is a parity check matrix for a q-ary code of length n with minimum Hamming distance $2l+1$, where if $B_r(i)$ represents an r-bit binary expansion of an integer i, vector $I_{H_l}(S)$ is formed such that an i-th entry of $I_{H_l}(S)$ is $|\{v \in S : H_l \cdot v = B_r(i)\}|$ mod 2, where a matrix $H_1 \in F_2^{u \times q^r}$ is a parity check matrix for a code over $F_2$, which has minimum Hamming distance $2h+1$.

15. The system of claim 13, wherein $w_2$ is determined according to the equation $$w_2 = \sum_{i=1}^{q^r} b_i \cdot \sum_{j=1}^{|S_{H_l,i}|} \overline{H}_l \cdot S_{H_l,i,j},$$

where matrix $$H_F = \begin{pmatrix} H_l \\ \overline{H}_l \end{pmatrix} \in F_q^{n \times n}$$

has full rank and $\overline{H}_l \in F_q^{(n-r) \times r}$, where a sequence $b = (b_1, b_2, \ldots, b_m) \in F_q^{n-r}$ is such that for any vector $a = (a_1, a_2, \ldots, a_m) \in \{-1, 0, 1\}$ with at most s non-zero components $a \cdot b^T = 0$ if and only if a is equal to an all-zeros sequence, wherein set $S_{H_l,i} = |\{v \in S\ H_l \cdot v = B_r(i)\}|$ and a j-th element of $S_{H_l,i}$, when ordered lexicographically, is denoted $S_{H_l,i,j}$.

16. The system of claim 13, wherein the processor is further configured to perform the step of receiving the requested missing documents pertaining to the missing string vectors from the other of the first host device and the second host device using information from $S_a \Delta S_b$.

* * * * *